Patented Sept. 10, 1946

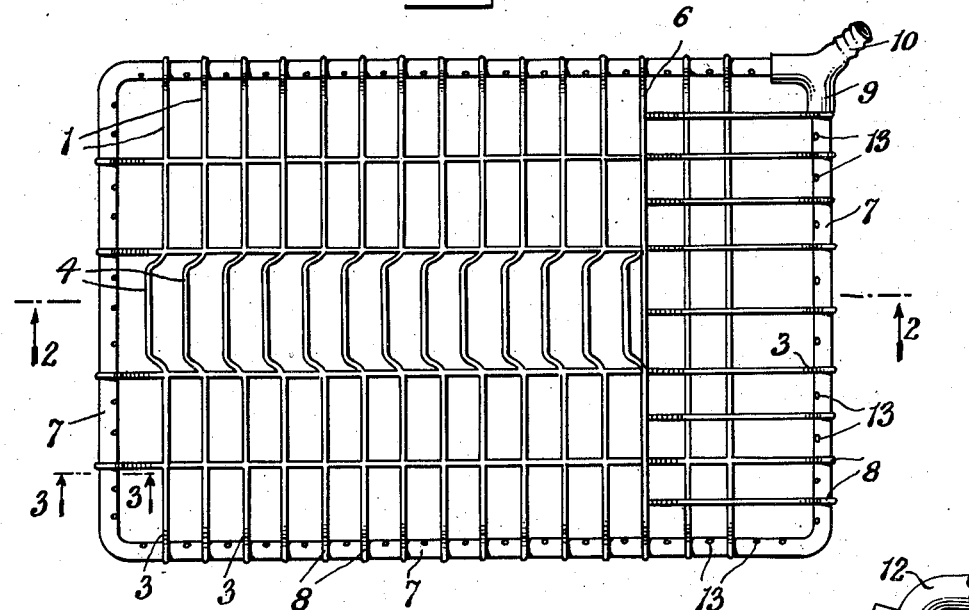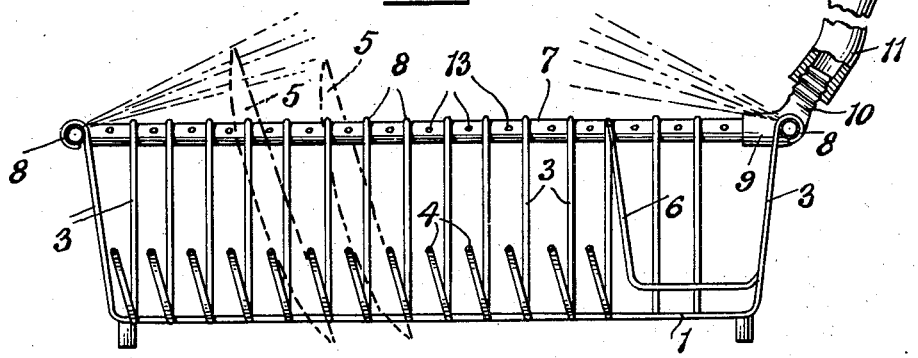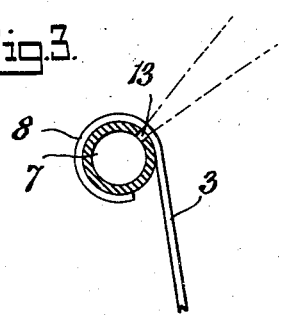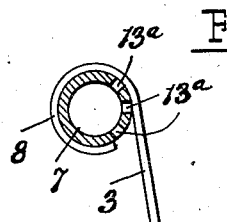

2,407,533

UNITED STATES PATENT OFFICE 2,407,533

DISHWASHING DEVICE

Margaret M. Brock, Middle Village, N. Y.

Application January 27, 1944, Serial No. 519,843

1 Claim. (Cl. 134—199)

This invention relates to dish-washing devices, and more particularly to means by which a number of dishes or other articles or utensils are supported in a drainage rack and receive jets of water from spray openings in means supported by and forming a part of the rack.

The primary object of the present invention is to provide a rack, or so-called "wire basket" in which means are provided for supporting a plurality of dishes or similar articles in spaced relation, said rack having a tubular upper edge or rim formed with a plurality of perforations or spray holes, and from which jets of water are emitted over the dishes to wash or rinse the same. With this structure, connected by flexible tubing to a faucet or other water outlet, the washing and drying of dishes is greatly simplified; water is conserved, and clean, completely-washed dishes result with a conservation of energy on the part of the housewife.

The invention further contemplates, in a device of this character, means by which a wire receptacle will constitute not only a drying rack for dishes which have been washed, but will also constitute a rinsing means by which the dishes may be rinsed by being sprayed with water of very high temperature, if desired, since handling of the dishes during the rinsing operation is unnecessary. An object therefore, of the invention is to provide in a single instrumentality, means for spraying the supported dishes with rinse water, means for permitting the sprayed water to drain off and flow away from the dishes, and means for supporting the dishes in the rack to permit them to become fully dry, or partially dry if subsequent wiping is preferred.

In the accompanying drawing, in which an illustrative embodiment of the invention is shown, Fig. 1 is a plan view of a dish-washing device made in accordance with the invention; Fig. 2 is a sectional view on the line 2—2 of Fig. 1; Fig. 3 is a sectional view on the line 3—3 of Fig. 1, and Fig. 4 is a sectional view of a modification.

The device includes a basket or other similar receptacle of a foraminous nature so arranged that the sprayed water can readily flow off and away from the dishes contained within the basket.

In the form shown, the basket is indicated as being of square or rectangular shape and of a size permitting it to be conveniently placed in a kitchen sink of conventional form. The body of the basket may be composed of wire, and as shown it includes the spaced bottom wires 1 bent upwardly as at 3 to form the sides and ends of the basket. Some of the wires are upwardly arched as at 4 to thereby constitute separating partitions for plates 5 or other dishes to be rinsed and dried.

The basket may also be divided as indicated at 6 into suitable compartments for the reception of cups, glasses, table ware and other articles. It will be understood that the interior arrangement of the basket may be varied in many ways to accommodate various dishes to be washed.

The top of the basket, and regardless of the general shape of the basket itself, is greatly strengthened and reinforced by an upper frame or rim 7 about which the upper ends of the wires 3 are curled as at 8 and to which these wires are securely attached by welding or the like. Said frame or rim 7 is in the form of a continuous tube, and at one point, and preferably at a corner of the basket, it is provided with a Y-shaped connection 9 including a projecting nipple 10 which attaches to a flexible tube 11 extending to and detachably connected to a faucet 12 or other source of water supply.

The tubular frame 7 is provided with a plurality of spaced spray openings or holes 13 directed toward the center of the basket and preferably directed upwardly at an angle of approximately 45° so that the water emitted from said openings will be in the form of a plurality of fine streams, and will be sprayed over the dishes contained in the basket and thoroughly wash said dishes.

With an arrangement of the kind shown, the washing of the dishes is greatly simplified. The soapy dishes are placed in the rack and when a flow of water is directed through the tube 11 and through the tubular frame 7, it will be ejected out of the spray holes 13 in a plurality of fine streams over the dishes, thus readily washing the soap therefrom and completely rinsing the dishes. Since the hands need not come into contact with the dishes or the water during the spraying operation, very hot water may be used, and thus an effective and very sanitary cleaning of the dishes will result. The wire basket, of which the frame 7 constitutes the upper edge and greatly stiffens and reinforces the basket, is of such a foraminous nature that all of the water sprayed on the dishes from the holes 13 will quickly drain from the dishes and out of the basket, so that after the flow of rinsing water has been discontinued the dishes may remain in the rack until they have thoroughly dried, or at least partly dried if the housewife prefers to wipe the dishes after the wash. Thus, with the use of the device, washing of the dishes becomes merely a matter of cleaning the dishes with soapy water, standing them in the rack and allowing a flow of hot rinse water to spray the dishes and then allowing the dishes to dry in the rack in which they were sprayed.

It will be obvious that various modifications may be made in the structure without departing from the spirit of the invention. For example, while the tubular member 7 is shown as being provided with a single row of spaced holes 13, it will be obvious that the tubular member may be provided with several rows of holes such as is shown at 13a in Fig. 4. The size and shape of the basket, and resultantly the tubular rim thereon may be changed to suit various types of sinks; the rack arrangement in the basket may be materially altered; and other changes in design may be made without departing from the principle of operation herein set forth and the structure as defined by the claim appended hereto.

What I claim is:

A dish-washing and draining device comprising, a wire basket adapted to be placed in a conventional kitchen sink and provided with rack elements for receiving and supporting a plurality of dishes, an encircling spray tube consisting of a tubular member forming a part of the basket and extending around the top edge of the same and constituting a stiffening frame therefor, said basket including side portions having substantially vertical wires curled at the top around the tube and secured thereto, the tube being provided with inwardly-directed spray openings located between the curled-over ends of the wires, the tube being formed into a continuous annulus by means of a substantially Y-shaped union located at one corner of the top of the basket, said union having two oppositely disposed leg portions coupling together the ends of the tube, said union having a third leg constituting a nipple for connecting the tube to a source of water.

MARGARET M. BROCK.